United States Patent [19]

Matsumoto

[11] Patent Number: 4,477,162
[45] Date of Patent: Oct. 16, 1984

[54] CAMERAS WITH A FILM LOADING DEVICE FOR FACILITATING FILM LOADING

[75] Inventor: Toshiaki Matsumoto, Izumisano, Japan

[73] Assignee: Minolta Camera Kabushiki Kaisha, Osaka, Japan

[21] Appl. No.: 403,998

[22] Filed: Aug. 2, 1982

[30] Foreign Application Priority Data

Aug. 5, 1981 [JP] Japan .............................. 56-121901
Sep. 4, 1981 [JP] Japan .............................. 56-138376

[51] Int. Cl.$^3$ .............................................. G03B 1/24
[52] U.S. Cl. .............................. 354/173.11; 354/212; 242/71.6; 226/84
[58] Field of Search .................. 354/170, 171, 172, 173, 354/202, 203, 288, 212, 213, 214, 215; 226/82, 83, 84, 85; 242/71.6

[56] References Cited

U.S. PATENT DOCUMENTS

| | | | |
|---|---|---|---|
| 3,377,936 | 4/1968 | Goshima et al. | 354/212 |
| 3,384,319 | 5/1968 | Saito et al. | 354/212 |
| 3,387,546 | 6/1968 | Winkler et al. | 354/212 |
| 4,239,362 | 12/1980 | Katayama et al. | 354/212 |

FOREIGN PATENT DOCUMENTS 217844 10/1961 Austria .............................. 354/212
2732726 2/1979 Fed. Rep. of Germany .
56-1020 1/1981 Japan .

OTHER PUBLICATIONS

Research Disclosure, Eastman Kodak, No. 20404, "Film Take-Up Reel for Photographic Camera" p. 152, Klaus Sitzler.

Primary Examiner—A. A. Mathews
Attorney, Agent, or Firm—Wolder, Gross & Yavner

[57] ABSTRACT

A camera includes an internal cover plate which is supported independently of a camera back cover for movement between covering and uncovering positions where it covers and uncovers a film take-up chamber respectively. When the internal cover plate is in the covering position, its inner surface contacts a leader portion of a film pulled out of a film cartridge received in a film cartridge chamber, for preventing a sprocket hole of the leader portion of the film having engaged one of sprocket pawls of a sprocket from being disengaged therefrom. The sprocket is provided at a position past an exposure station for transportation of the film toward the film take-up chamber. When the camera back cover is held in an open position, the film transportation by the sprocket is automatically effected by an electric motor in response to the movement of the internal cover plate from the uncovering position to the covering position and the leader portion of the film transported into the film take-up chamber is automatically wound around a spool by engagement of one of the sprocket holes with one of spool pawls of the spool. The film transportation in this case is automatically interrupted when an initial frame of the film comes in alignment with an exposure aperture at the exposure station. The internal cover plate is releasably locked in the covering position by a detent member.

19 Claims, 17 Drawing Figures

FIG.9
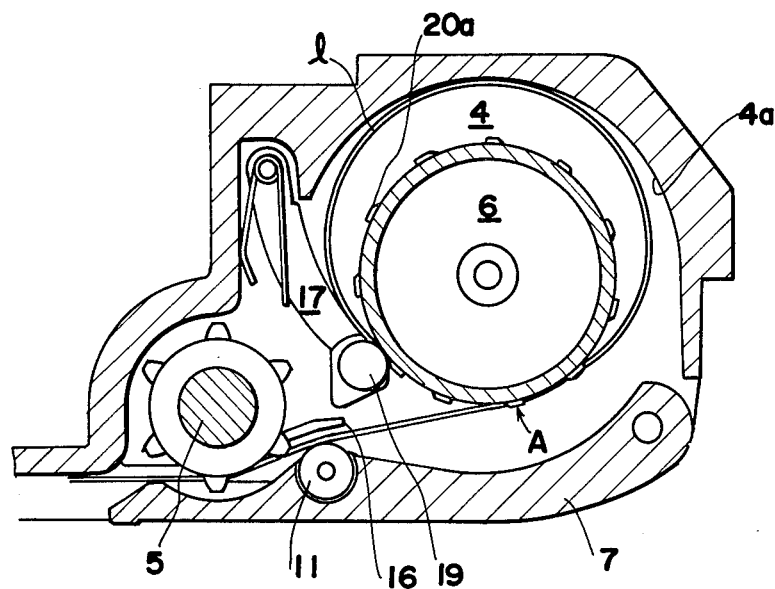
FIG.10
FIG.11
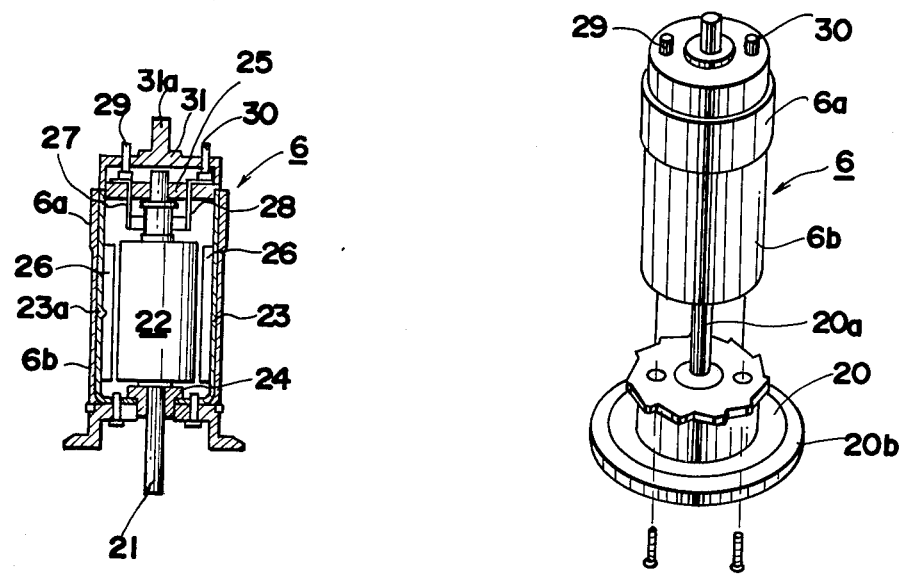

CAMERAS WITH A FILM LOADING DEVICE FOR FACILITATING FILM LOADING

BACKGROUND OF THE INVENTION

1. Field of the Invention

The present invention relates to a camera provided with a film loading device which facilitates film loading.

2. Description of the Prior Art

Heretofore, film loading devices for easy film loading have been those where the user may only pull out the film leader a given length, put the leader on a predetermined portion of the camera, close the camera back cover and perform the film wind-up operation, whereby the film is advanced by a sprocket and the film leader is wound-up on a spool. However, such film loading devices generally to comform to rules with respect to the amount of film leader to be drawn out and the way of setting the leader and the film cannot be wound-up when any one of such rules is not observed. Additionally, the film advancing starts only after the camera back cover has been completely closed, so that the user can not see whether the film is properly advanced or not. Therefore, the user is always afraid lest the film should not be wound-up properly even if it is wound-up properly. If the film is actually not wound-up properly, the subsequent exposures will bear no result. Accordingly, especially for photographers who are not accustomed to film loading, it is troublesome to pay close attention to the rules for film loading, therefore, such a camera is inconvenient.

On the other hand, in the case of a camera with a builtin or detachably attached motor-driven film wind-up device, it is convenient for the user if the film loading is automatically effected by the motor-driven device in place of manual operation. Further, it will be more convenient if the exposed or preliminary portion of a film is wound-up in association with the film loading to locate the portion of the film for the first frame at the exposure station of the camera and align the portion with the camera exposure aperture, thereby enabling immediate exposure operation at any desired time.

SUMMARY OF THE INVENTION

It is, accordingly, an object of the present invention to provide a camera with a film loading device which, with a camera back cover being opened, allows observation of a portion of a film being transported for the loading thereof, so that even photographers who are not accustomed to film loading can be relieved of the above inconveniences.

Another object of the present invention is to provide a camera with a film loading device which further facilitates film loading by use of automatic film transportation.

To accomplish these objects, a camera of the present invention is provided with a sprocket which has sprocket pawls successively engageable with sprocket holes of a film and an internal cover member which is supported independently of the camera back cover for movement between covering and uncovering positions where it covers and uncovers a film take-up chamber respectively. Locking means is provided for releasably locking the internal cover member in the covering position and the internal cover member, in the locked condition, i.e., in the covering position, where it contacts the film pulled out of a film cartridge housed in a film cartridge chamber, for preventing one of the sprocket holes having engaged one of the sprocket holes from being disengaged therefrom. The sprocket is provided at a position past an exposure station having an exposure aperture for transporting the film into the film take-up chamber whereas a spool is provided in the film take-up chamber such that the film transported by the sprocket into the film take-up chamber is wound therearound. For enabling the winding of a leader portion of the film arround the spool, the latter is provided with spool pawls engageable with sprocket holes of the leader portion of the film.

With the above construction, a film loading is effected as follows. At first a film cartridge is housed in the film cartridge chamber and a film incorporated therein is pulled out to have its leader portion put on the sprocket so that at least one sprocket hole of the leader portion of the film engages one of the sprocket pawls. The internal cover member is thereafter closed to move to the covering position while the camera back cover is kept opened. When the film winding operation is effected at this time to rotate the sprocket and the spool, the leader portion of the film is transported into the film take-up chamber by successive engagement of the sprocket holes with the sprocket pawls and the winding of the film around the spool by the engagement of one of the spool pawls with one of the sprocket holes. As the camera back cover is kept opened during these operations, a portion of the film being transported can be observed from the exterior at a position not covered by the internal cover member such as at the position of the exposure station, so that a photographer can confirm whether the film transportation is being effected or not.

Preferrably, driving means having an electric motor for driving the sprocket and the spool and a motor driving circuit therefor may be provided for automatically effecting the film transportation and winding. The motor driving circuit may include a switch closed for supplying electric power to the motor in response to the closure of the internal cover member, whereby the film transportation and winding can be effected automatically only by closing the internal cover member after the leader portion of the film is put on the sprocket as described above.

The above and other objects and features of the present invention will become more apparent from the following descriptions of preferred embodiments taken in conjunction with the accompanying drawings.

BRIEF DESCRIPTION OF THE DRAWINGS

FIG. 9 is an enlarged fragmentary sectional view of a pertinent portion of the camera according to the first embodiment, at the stage of film wind-up operation;

FIG. 10 is a vertical sectional view of the spool shown in FIG. 7;

FIG. 11 is an exploded perspective view of the spool shown in FIG. 7;

DESCRIPTION OF THE PREFERRED EMBODIMENTS

Figure 1:
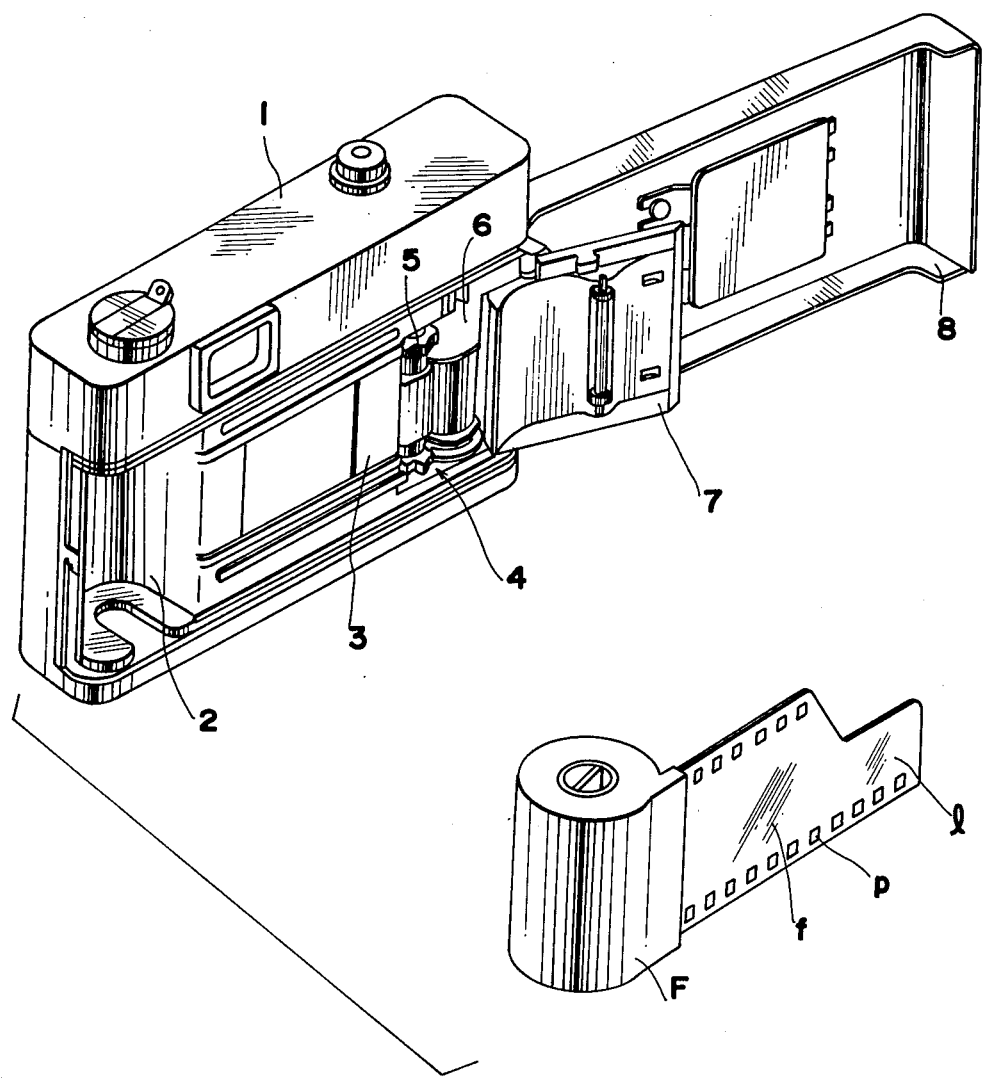
FIG. 1 is a perspective view showing an open camera and film cartridge according to the first embodiment of the present invention.

To facilitate the understanding of the present invention, a summary explanation is at first given about the basic construction or arrangement of an embodiment thereof. With reference to FIG. 1, camera body 1 is provided with film cartridge chamber 2, exposure station 3 with an exposure aperture and film takeup chamber 4. In film take-up chamber 4 are mounted film transportation sprocket 5 and film take-up spool 6. Internal cover plate 7 is pivotably supported in the camera body to cover and uncover film take-up chamebr 4. Internal cover plate 7 can be restrained by a lock mechanism described later on, at a position covering film take-up chamebr 4, and is arranged to press a film against sprocket 5 when it is at the covering position. Camera back cover 8 can light-sealingly cover and uncover, in the well-known manner, film cartridge chamber 2, exposure station 3 and film take-up chamber 4. Camera back cover 8 is supported by camera body 1 for an opening and closing operation independent of internal cover plate 7. Film cartridge F of the well-known type includes therein film f with leader portion 1 having a reduced width, and is adapted to be loaded in the camera of the embodiment.

Figure 2:
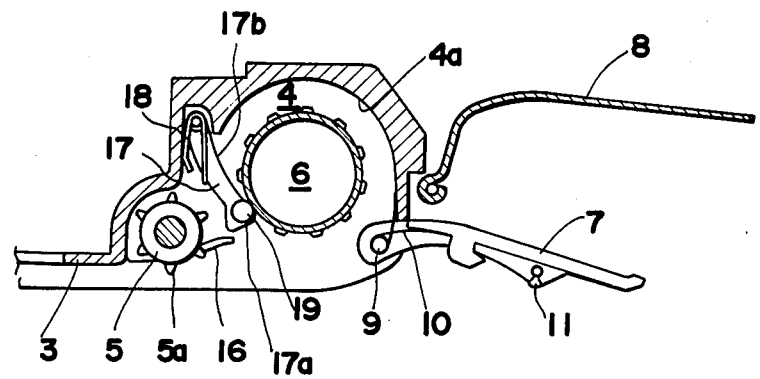
FIGS. 2 and 3 fragmentary sectional views showing a pertinent portion of the camera shown in FIG. 1.
Figure 3:
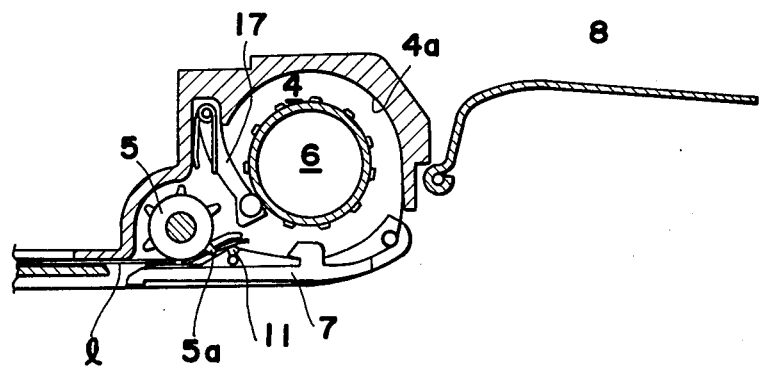
Figure 4:
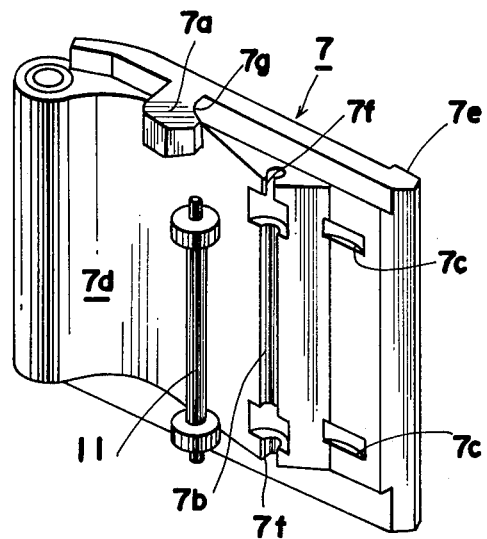
FIG. 4 is an exploded perspective view of an internal cover plate to be used in the camera of the first embodiment mentioned above.

The operation of the above mechanism will then be described briefly. For loading camera body 1 with film f, film cartridge F is put into and locked in film cartridge chamber 2 with the camera body in the condition shown in FIG. 1, the film leader is drawn out from film cartridge F across exposure station 3 and leader portion 1 of film F is put on sprocket 5. Then, internal cover plate 7 is closed to press leader portion 1 against sprocket 5 by the internal cover plate, ensuring that leader portion 1 does not unexpectedly disengage from sprocket 5 by any means. Accordingly, when a film wind-up operation is carried out with that condition, film f is advanced by sprocket 5 to spool 6 around which the film is wound consecutively. In this case, internal cover plate 7 only partially covers the portion of the film drawn-out from cartridge F with the rest of the drawn-out film portion being left exposed, whereby the user can see whether the film is or is not properly loaded, by observing the exposed portion of the film being advanced or not in response to the wind-up operation. After recognizing advancing of the film in this way, the user may close camera back cover 8 and wind up the portion of the film that has been exposed to the ambient light during the loading, whereby a film loading operation is completed A preferred embodiment will now be described in more detail. With reference to FIGS. 2 and 3 showing a section of a pertinent portion of the camera shown in FIG. 1, internal cover plate 7 is supported by rod 9 mounted on the camera body and is urged by spring 10 in a counterclockwise direction e.g. in the direction to open film take-up chamber 4. Internal cover plate 7 has formed hooked portion 7a (see FIG. 4) at the upper edge thereof. On the inner surface facing film take-up chamber 4, internal cover plate 7 has formed recess 7b shaped to receive first film pressure roller 11, a pair of grooves 7c for receiving portions of claws or teeth 5a formed at the upper and lower ends of sprocket 5, and curved guide surface 7d for guiding the leader portion of the film that is supplied from sprocket 5 into film take-up chamber 4. Internal cover plate 7 has further formed, on its outer surface, projection 7e to which camera back cover 8 is abuttable. At the upper and lower end portions of recess 7b on internal cover plate 7, are formed a pair of bearing portions 7f for preventing film pressure roller 11 from coming off the recess. Film pressure roller 11 is rotatably journaled by bearing portions 7f. Internal cover plate 7 is integrally molded of resilient material such as synthetic resin, so that film pressure roller 11 fits in recess 7b by expanding the pair of bearing portions 7f and thereby mounted on internal cover plate 7.

Figure 5A:
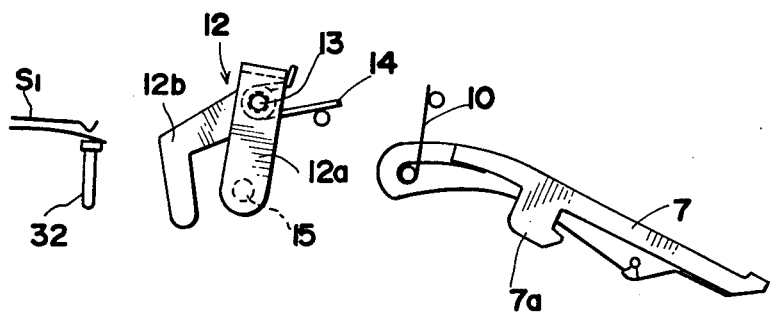
FIGS. 5(A), 5(B), 5(C) are schematic explanatory illustrations showing a camera mechanism of the first embodiment at different stages of operation.
Figure 5B:
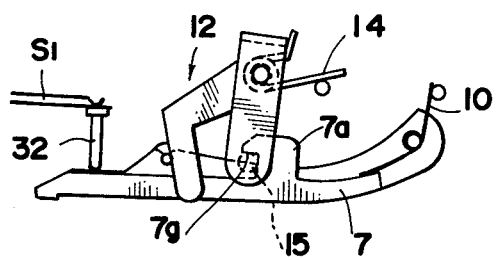
Figure 5C:
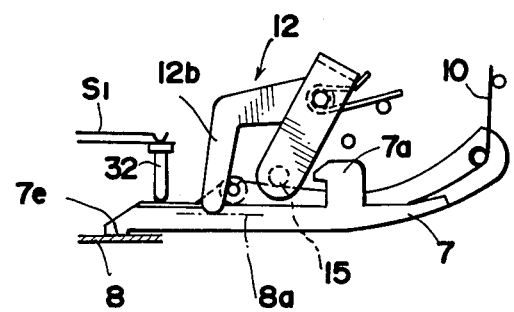

At the upper portion of film take-up chamber 4 in camera body 1 is mounted detent member 12 of the shape as shown in FIG. 5, which constitutes a lock mechanism for internal cover plate 7 together with hooked portion 7a of the internal cover plate. Detent member 12 is rotatably supported by pin 13 on camera body 1 and is urged by spring 14 to turn in the counterclockwise direction. Detent member 12 includes upper arm 12a and lower arm 12b. Upper arm 12a carries lock pin 15 which engages hooked portion 7a with internal cover plate 7 being at its covering position. The end of lower arm 12b extends to a position where it can engage camera back cover 8, whereby when camera back cover 8 is closed, lower arm 12b is pushed by upper edge 8a of camera back cover 8 to turn detent lever 12 clockwise largely to disengage lock pin 15 from hooked portion 7a of internal cover plate 7 as shown in FIG. 5(C).

Figure 6:
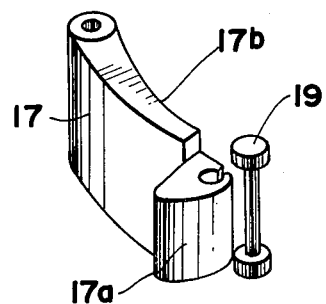
FIG. 6 is an exploded perspective view of a film pressing member used in the camera of the first embodiment.

As seen from FIGS. 2 and 3, film guide plate 16 is secured on camera body 1 in the vicinity of exposure station 3. Film guide plate 16 extends over sprocket 5 to the vicinity of spool 6 and serves to prevent leader portion 1 of the film from incorrectly entering between exposure station 3 and sprocket 5. To the space between sprocket 5 and spool 6 extends film pressure arm member 17 which is pivoted at the deep inner portion of film take-up chamber 4 for rotation of a predetermined angle. End edge 17a of film pressure arm member 17 has a shape to cooperate with film guide plate 16 to prevent leader portion 1 of the film from erroneously entering between sprocket 5 and spool 6. Film pressure arm member 17 is urged by spring 18 to always bear against the outer periphery of spool 6. Second film pressure roller 19 is rotatably supported by film pressure arm member 17 at the position where it engages spool 6. Film pressure arm member 17 is formed with curved edge 17b for guiding leader portion 1 of film F to along the outer periphery of spool 6. It is to be understood that film pressure arm member 17 is integrally molded of resilient material such as synthetic resin as is internal cover plate 7 and that film pressure roller 19 may be attached to the film pressure arm member 17 in the same manner as that of the attachment of roller 11 to internal cover plate 7. (see FIG. 6)

Figure 7:
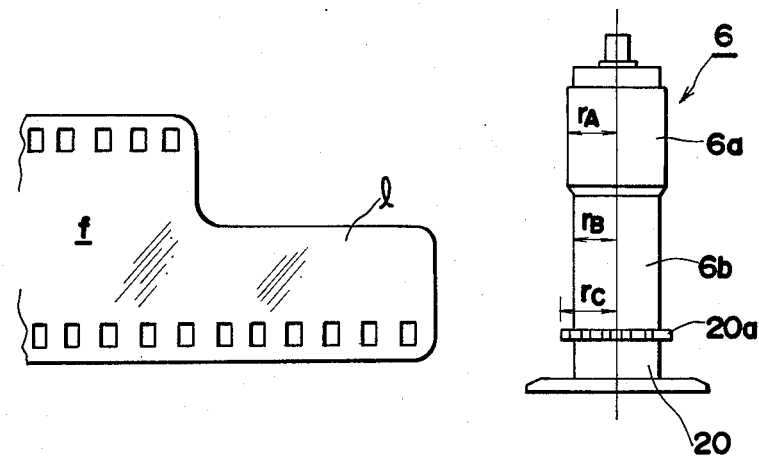
FIG. 7 is a front view of a spool used in the camera of the first embodiment.
Figure 8:
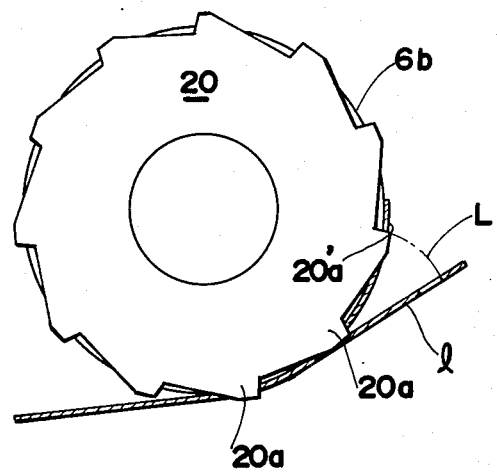
FIG. 8 is an explanatory view showing the shape of the spool claws or teeth on the spool shown in FIG. 7.

Spool 6 has large diameter portion 6a and reduced or small diameter portion 6b as shown in FIG. 7 and the height of the step between, i.e. the difference between the radius rA of large diameter portion 6a and the radius rB of small diameter portion 6b, is approximately equal to the thickness of film F, e.g. about 0.15 mm. Therefore, when film F is wound around spool 6, its leader portion 1 takes up its position over the periphery of the small diameter portion 6b filling or compensating for the reduced diameter. The full width portion of film F which follows leader portion 1, is wound on a hypothetical cylinder of the same diameter along its longitudinal direction. Accordingly, with the spool formed in this manner, the film is prevented from winding incorrectly, in the shape of a cylinder. It is wound in a volute shape (the shape as of a volute spring) due to the fact that the lower half of the spool increases its diameter by the thickness of the leader portion of the film wound therearound with the spool having a uniform diameter. At the lower portion of the small diameter portion 6b is a rotation member 20, having formed with spool pawls 20a which are engageable with sprocket holes of film F. Rotation member 20 is corotatable with spool 6. The amount of projection of spool pawls 20a from the periphery of small diameter portion, i.e. the difference between radii rB and rC (see FIG. 7) is approximately twice as large as the thickness of film F, for example, 0.3 mm. This is to avoid breakage of the film at the sprocket holes, by disabling the engagement of spool pawls 20a with film F once the leader portion 1 has been wound and a subsequent full width portion has been wound for one turn. It should be noted that spool pawls 20a are formed as shown in FIG. 8, such that the root of each pawl or the bottom or lowest point of the recess between each adjoining pawls is somewhat radially inwardly retracted, i.e. closer to the center than from the periphery of small diameter portion 6b. Whereas the portions of spool pawls 20a that project from the periphery of the small diameter portion 6b are not affected by error in the molding of rotation member 20 of synthetic resin material. They have been shaped, as determined in the design to enter sprocket holes even if the roots of the pawls or the lowest portions of the recesses are not formed as expected, due to flashes or fins. Additionally, the edge 20a' of spool pawl 20a that engages the front side of a sprocket hole with spool pawl 20a extending through the hole, has a form similar in shape to involute curve L.

The operation of the above described arrangement will now be explained in detail. With the condition shown in FIG. 1, film cartridge F is loaded in camera body 1. Then leader portion 1 of film F is pulled and put on sprocket 5 such that its sprocket hole P is engaged by sprocket claw 5a or portions of the sprocket holes are located above sprocket claws 5a. Then internal cover 7 may be closed to move from the uncovering position shown in FIG. 5(A) to the covering position shown in FIG. 5(B). This causes the hooked portion 7a formed on the upper edge of internal cover plate to advance pushing aside lock pin 15 carried by upper arm 12a of detent member 12 until internal cover plate 7 reaches its covering position. Then lock pin 15 returns by the force of spring 14 to engage the hooked portion 7a and lock internal cover plate 7 at the covering position. With internal cover plate 7 having been closed, leader portion 1 of film f is curved by first film pressure roller 11 as shown in FIG. 3. This is such that film f extends along the generally cylindrical periphery of sprocket 5 with the tips of sprocket pawls 5a entering grooves 7c and 7c formed on inner surface of internal cover plate 7. Thereby sprocket pawls 5a always mesh with the sprocket holes. When this condition occurs with the film wind-up operation, sprocket 5 rotates and film F is advanced to film take-up chamber 4 by sprocket claws 5a meshing sprocket holes. While this film wind-up operation is occuring, although internal cover plate 7 prevents a portion of the film drawn out from the film cartridge F from being observed from the exterior portion of film F that is covered by internal cover plate 7, for example, the portion lying over the exposure aperture of exposure station 3, can be seen from the exterior. This enables the user to confirm whether film F is properly loaded by observing whether the uncovered portion of the film is moving or not responding to the film wind-up operation.

If the film transportation is not effected, the user should open internal cover plate 7 once again and reposition the leader portion correctly. This case might occur when internal cover plate 7 is closed with leader portion 1 of film f being put on sprocket 5 such that leader portion 1 remains inclined in the film transporting direction. In other words, the sprocket holes are not aligned with sprocket claws. To open the internal cover plate 7 that has been closed and locked, the user should put his finger on the inner side of internal cover plate 7 at its free side portion. Then it should be pulled to turn the internal cover plate 7 in the opening direction. The hooked portion 7a at the upper edge of internal cover plate 7 is formed with the slanted surface 7g at the portion to be engaged by lock pin 15 as shown in FIG. 5(B). Therefore, a large force applied to internal cover plate 7 in the opening direction will cause slant surface 7g to push aside lock pin 15 to the outside of the path of hooked portion 7a and enable the movement of internal cover plate 7 to its open or uncovering position. Then, the user may reset leader portion 1 of film f with internal cover plate having been opened in that way.

Upon setting the film, even if internal cover plate 7 has been closed with sprocket claws failing to mesh sprocket holes formed in leader portion 1 of film f, i.e. with sprocket claws 5a engaging the portions of film F between adjoining sprocket holes, film F never fails to be transported in the case of the present embodiment. According to the embodiment, first film pressure roller 11 and a pair of grooves 7c moves film f into abutment with the periphery of sprocket 5 as described above. The results are that sprocket 5 is turned a little by the film wind up operation to change the positions of sprocket claws 5a. The sprocket claws 5a enter sprocket holes respectively positioned a little in advance of the sprocket holes to enable film transportation.

The leader portion 1 of film f that is supplied to film take-up chamber 4 by the rotation of sprocket 5 is guided to reach the cylindrical periphery of spool 6. It is prevented by film guide plate 16 and end edge 17a of film pressure arm member 17 from entering the space between sprocket 5 and spool 6 due to its coiling tendency, i.e. what is called "curling". The spool 6 also rotates in the counterclockwise direction as viewed in the Figures, i.e. in the same direction as that of sprocket 5 in response to a film wind-up operation. Therefore, the leader portion 1 of film f that has reached cylindrical periphery of spool 6, is engaged through sprocket holes by spool pawls 20a at the lower portion of spool 6 and wound around the periphery of spool 6. Additionally, even in the case where film f does not have a coiling tendency and does not tend to approach spool 6 by its nature, leader portion l of film f is guided to the periphery of spool 6 by curved guide surface 7d formed on the inner surface of internal cover plate 7. It is further guided by curved inner wall 4a of the film take-up chamber 4 and curved guide edge 17b of film pressure arm member 17 to encircle spool 6. Moreover, the second pressure roller 19, supported at the end portion of film pressure arm member 17, bears against the periphery of spool 6 as seen in FIG. 9. So the first sprocket hole never fails to be engaged by spool pawl 20a at the position of roller 19 and subsequently winds around the periphery of the spool.

This is a condition where the first sprocket hole in leader portion l of film f is engaged by spool pawl 20a at the position where the second film pressure roller 19 abuts spool 6. Then it is possible that one of the subsequent spool pawls engages one of subsequent sprocket holes as indicated by arrow A in FIG. 9, forming a large loop of the film. If the film wind-up occurs leaving such a large loop formed, problems will occur such as the film winding coaxially on the spool in the form of a true circle in horizontal section, or such that the emulsion surface of the film is injured. In the above described embodiment, however, the film that was once engaged by spool pawl 20a at point A increases the curvature of its loop as the engaging point approaches film pressure arm member 17. This causes a resilient or restoring force to disengage film f from the spool pawl. Also the front edge 20a' of spool pawl 20a that is engaged by the film is formed to follow involute curve L (see FIG. 8) as mentioned before. Thus the sprocket hole engaged by spool pawl 20a at point A can easily disengage from that spool pawl. Therefore, the film wind-up operation is continued, and the film is automatically tightly wound on the periphery of spool 6 without any gap between turns.

After leader portion l of the film has been wound in the above explained manner, camera back cover 8 may be closed. Further film wind-up operation may be effected to align an unexposed portion of the film with the exposure aperture whereby the film loading operation is completed.

It should be understood that upon closure of camera back cover 8, its upper rim 8a pushes the end of lower arm 12b of detent member 12 immediately before the camera back cover 8 reaches its closing position, and turns the detent member integrally to disengage lock pin 15 from hooked portion 7a of internal cover plate 7, thereby the lock of internal cover plate 7 is temporarily released at its covering position. However internal cover plate 7 never opens at the time when detent member 12 releases internal cover plate 7 because camera back cover 8 pushes projection 7e formed at the free end of internal cover plate 7, and the internal cover plate 7 is held at the covering position by the engagement of projection 7e with camera back cover 8.

To remove the exposed film from the camera body, camera back cover 8 should be opened after the exposed film has been rewound into the film cartridge. When camera back cover 8 is opened, internal cover plate 7 follows the camera back cover 8 under the action of spring 10 to move to its open or uncovering position. With the opening of camera back cover 8, detent member 12, that has been depressed by the camera back cover (see FIG. 5(C)) rotates in the counterclockwise direction. It tends to lock internal cover plate 7 again at its covering position by lock pin 15. However, at the time when lock pin 15 returns to its locking position, internal cover plate 7 has moved a little toward its open position, with the end of hooked portion 7a having gone outside of the moving path of lock pin 15. Thus the internal cover plate 7 moves to its open position without being locked again and becomes ready for the next film loading. (See FIGS. 1, 2 and 5(A)).

The above film loading operation is possible for two types of wind up mechanisms. It works in cameras which have a manual film wind-up mechanism arranged such that a spool and a sprocket rotate in response to the operation of a wind-up lever. It is also for cameras with an automatic film wind-up mechanism arranged to rotate a sprocket and a spool by the action of an electric motor after completion of each exposure. The above embodiment is applied to the latter type of camera.

An explanation will now be given about the arrangement for the automatic film wind-up mechanism. In the present invention, described above, spool 6 is formed to utilize an outer cylinder enclosing a rotor shaft of an electric motor. With reference to FIG. 10, electromagnetic coil 22 is wound around rotor shaft 21. Outer cylinder 23 enclosing electromagnetic coil 22 is rotatably supported at its top and bottom by bearing members 25 and 24. A plurality of permanent magnets 26 are fixed to the internal wall surface of outer cylinder 23 at the positions opposite to electromagnetic coil 22. The aforementioned large diameter portion 6a and small diameter portion 6b constitute the outer periphery of spool 6. They are formed by integrally molding a synthetic resin material on the outer periphery of outer cylinder 23 using a technic similar to insert molding. Some portions of the resin material flow during the molding process into recesses 23a, formed for the purpose of securing permanent magnets 26, thereby ensuring the connection between the outer cylinder 23 and the resin material portion. Brushes 27 and 28 serve the power supply to electromagnetic coil 22 and are secured on bearing member 25 which is corotatable with outer cylinder 23. Electrically conductive pins 29 and 30 are respectively connected with brushes 27 and 28 for the supply of power from an outer power source. Spool support axle 31 is fixed on bearing member 25 and supports conductive pins 29 and 30. Spool support axle 31 includes rotational axle 31a, which is mounted coaxially with rotor shaft 21. Spool pawls 20a are mounted as shown in FIG. 11 on rotation member 20. This in turn is provided with spool bottom disk 20b as an integral part. Rotation member 20 is secured on the bottom plane of outer cylinder 23 by means of screws or the like.

In the condition where spool 6 has been assembled within the camera body, its rotor shaft 21 and rotational axle 31a of spool support axle 31 are rotatably supported. The rotational force of motor 22 can be transmitted from the lower end of rotor shaft 21 through a reduction gear train (not shown) to outer cylinder 23 and a sprocket. Accordingly, when electromagnetic coil 21 is energized through conductive pins 29 and 30, the rotation of rotor shaft 21 is transmitted through the reduction gear train to outer cylinder 23 and the sprocket to rotate the spool and the sprocket in the direction necessary to wind-up a film.

Figure 12:
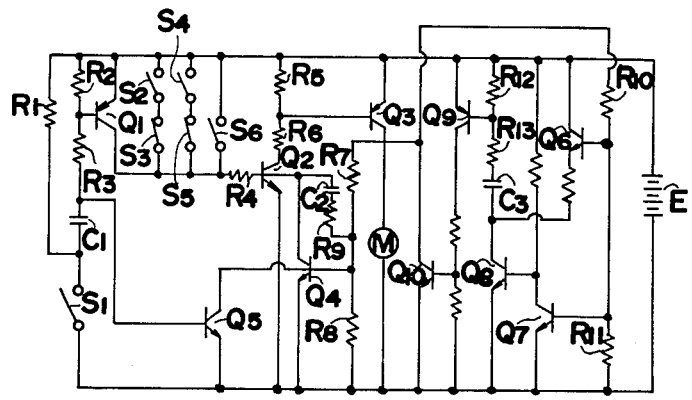
FIG. 12 is a circuit diagram of a driving circuit for use with the camera of the first embodiment.

FIG. 12 shows a driving circuit for driving the above mentioned electric motor. Power source E is connected through switch S1 to a timer circuit which includes series connected resistors R2 and R3 and capacitor C1. This is to discharge resistor R1 for capacitor C1. The node between resistors R2 and R3 is connected to the base of transistor Q1. Switch S1 is arranged to close only when internal cover plate 7 is closed. To this end, camera body 1 is provided, as shown in FIG. 5, with detecting pin 32 which is biased by an urging means (not shown) to project towards internal cover plate 7. Switch S1 is located at the back of detecting pin 32. The collector of transistor Q1 is connected through resistor R4 to the base of transistor Q2. This in turn has its collector connected through series connected resistors R5 and R6 to one electrode of power source E. The node between resistors R5 and R6 is connected with the base of transistor Q3. Thus, when transistor Q1 is rendered conductive, transistors Q2 and Q3 conduct in response to it. With transistor Q1 are pairs of switches connected in a parallel series; S2 and S3, S4 and S5, and a single switch S6. Thus transistors Q2 and Q3 are rendered conductive irrespective of the operation of transistor Q1 when any pair of switches or the single switch are closed. Switch S2 is interlocked with camera back cover 8 to be closed only when camera back cover 8 is closed. Switch S3 is normally open and is interlocked with a well-known film counter (now shown) to be opened when the film counter has advanced to the position for indicating the first frame number "1". It is left open until the film is rewound into the cartridge and is removed from the camera body and the film counter returns to its initial position. Switch S4 is normally open and is closed only while release button RB in FIG. 1 is depressed. Switch S5 is normally closed and is opened in synchronization with the start of travel of a shutter opening member (not shown). Switch S6 is normally open and is closed upon completion of the travel of a shutter closing member (also not shown).

Motor M is connected to the collector of transistor Q3, with series connected resistors R7 and R8 being connected across motor M. The node between resistor R7 and R8 is connected to the base of transistor Q4. This in turn has its collector connected to the base of transistor Q2 mentioned above. It forms with resistors R7 and R8, a feedback circuit for applying a constant voltage to motor M. As the feedback circuit applies to motor M a constant voltage determined as a fraction of the voltage divided by resistors R7 and R8, the voltage applied to the motor can be reduced to restrict the rotational speed of the motor. In the present embodiment, the resistances of resistors R7 and R8 are determined such that the rotational speed of motor M while the feedback circuit is in operation, is half as of what it is when not operated. Capacitor C2 and resistor R9 are provided for the prevention of oscillation.

Transistor Q5 is provided for the purpose of operational control of the above mentioned feedback circuit. It has its base connected to the node between resistor R3 and capacitor C1 in the above-mentioned timer circuit. The collector of transistor Q5 is connected to the base of transistor Q4. Thus, transistor Q5 is rendered conductive after a lapse of time determined by the time constant of the timer circuit. This is from the closure of switch S1 that is interlocked with internal cover plate 7, and switches transistor Q4 from conductive to non-conductive.

Resistors R10 and R11 are connected in series with the collector of transistor Q10. The node between resistors R10 and R11 is connected to the bases of transistors Q6 and Q7. The collector of transistor Q7 is connected to the base of transistor Q8 which in turn has its collector connected with a timer circuit including series connected resistors R12 and R13 and capacitors C3. Transistor Q6 has its collector and emitter respectively connected to both ends of the timer circuit R12, R13 and C3 and is connected across it. Between resistors R12 and R13 of the timer circuit is connected the base of transistor Q9 which in turn has its collector connected with the base of transistor Q10. This serves to short circuit electric motor 10. Transistors Q8, Q9 and Q10 are controlled by the on-off state of transistor Q7.

With the circuit as described above, when switch S1 interlocked with the internal cover plate is closed, transistor Q1 conducts to render transistors Q2 and Q3 conductive thereby energizing motor M. Thus the leader portion 1 of film f is advanced to film take-up chamber 4 through sprocket 5. On the other hand, immediately after the closure of switch S1, transistor Q5 is non-conductive to cause a potential of a given level at the base of transistor Q4 and render transistor Q4 conductive. Thus, the feedback circuit consisting of this transistor Q4 and resistors R7 and R8 is rendered operative in order to apply to motor M a constant voltage of the level determined by the ratio of resistances of resistors R7 and R8. It should be remembered that the ratio of the resistances of resistors R7 and R8 is determined to apply to the motor M a voltage that is lower than the voltage applied to the same with the feedback circuit for the constant voltage application being inoperative. For example there is a constant voltage to provide motor M a rotation speed that is about a half of the speed at the time of the feedback circuit being inoperative. Thus, the motor M rotates more slowly. After a lapse of a time determined by the resistances of resistors R2 and R3 and the capacitance of capacitor C1, from the closure of switch S1, transistors Q1, Q2 and Q3 are made non-conductive to stop the rotation of motor M. In synchronization with this, transistor Q5 is rendered conductive to make the feedback circuit inoperative. In that way, the leader portion of the film is wound up by the rotation of motor M for the given period of time. Since the wind-up of the leader portion of the film is effected at relatively slow speed by the motor rotating at the lower speed, the user can easily observe the transportation of the portion of the film that is not covered by the internal cover plate. If the film transportation is not effected, the user may open the internal cover plate and reset the leader portion of the film. When the internal cover plate is opened, switch S1 is opened to discharge rapidly through resistor R1, the electric charge stored in capacitor C1. This enables operation of the above-mentioned circuit upon re-closure of the internal cover plate.

After the wind-up of the leader portion has been confirmed, the camera back cover may be closed to close switch S2 which is connected in parallel with transistor Q1. Thus transistors Q2 and Q3 are rendered conductive again to energize electric motor M. In this case, however, capacitor C1 in the timer circuit has to be charged to a given level to make transistor Q5 conductive and transistor Q4 non-conductive thereby leaving the feedback circuit inoperative. Accordingly, motor M rotates at a high speed since it is applied with the voltage of power source E through transistor Q3. The rotation of the motor winds up the portion of the film lying over the exposure aperture that has been exposed to the ambient light with the camera back cover open. It also incrementally advances a film counter of known type until it reaches a position to indicate a counter graduation "1". The switch S3 is turned off to interrupt the power supply to motor M, thereby completing the film loading operation.

After the completion of the film loading operation mentioned above, release button R3 may be depressed to close switch S4 and render transistors Q2 and Q3 conductive thereby energizing motor M. The rotation of motor M after completion of the film wind-up actuates a shutter actuating member to open the camera shutter. In the case of a single lens reflex camera, for example, the rotation of motor M causes a mirror locking member to unlock a movable reflex mirror having been locked at its initial image observing position. Then, when the shutter opening member completes its travel, switch S5 is opened to render transistors Q2 and Q3 non-conductive, thereby stopping the rotation of motor M. After a lapse of a desired time from the opening of the shutter, the shutter closing member is activated to close the shutter. Upon completion of the travel of the shutter closing member, switch S6 is closed to energize motor M again. Therefore, in preparation for the next photographing operation, the film is wound up for one frame and the reflex mirror and diaphragm mechanisms return to their initial position. Upon return of the mechanisms to their initial position, switches S4 and S5 are opened.

The right half section of the circuit in FIG. 12 serves to brake motor M, preventing it from continuing rotation when it is deenergized. When transistor Q3 is made non-conductive to deenergize motor M, transistor Q7 having its base connected with the collector Q3, is switched from a conductive to a non-conductive condition to make transistors Q8, Q9, and Q10 conductive. With transistor Q10 made conductive, its emitter-collector shortcircuits motor M to brake the latter and rapidly stop its rotation. The period of time which transistor Q10 is conductive is determined by the time constant of the timer circuit, including resistors R12 and R13 and capacitor C3. Thus transistor Q10 is made non-conductive when the capacitor has been charged to a given level. Transistor Q6, connected across the timer circuit, serves to discharge the electric charge stored in capacitor C3. The operation of transistor Q6 guarantees the braking action to work every time that motor M is deenergized.

Figure 13:
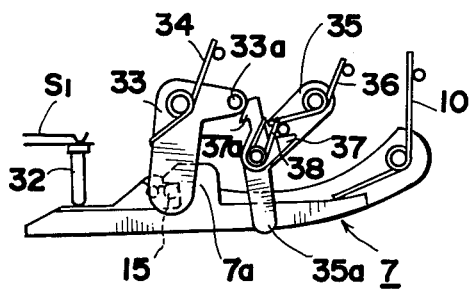
FIGS. 13(A), 13(B) and 13(C) are explanatory schematic illustrations of a pertinent portion of a camera according to a second embodiment of the present invention.
Figure 13:
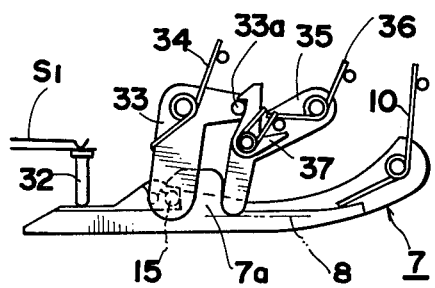
Figure 13C:
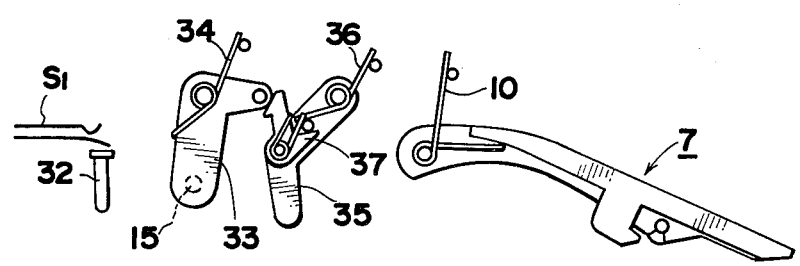

FIGS. 13(A), 13(B) and 13(C) show another embodiment of the present invention where the lock of the internal cover plate is released by the lock pin upon opening camera back cover 8. The internal cover plate 7 is retained only by the lock pin at the covering position. Whereas, in first embodiment explained above, the lock of internal cover plate 7 in released by lock pin 15 immediately before the completion of the closure of camera back cover 8. Internal cover plate 7 is pressed and directly held at its covering position by the closed camera back cover.

In the following, the second embodiment is described with the same reference numerals designating to the members having the same functions as those of the corresponding members in the first embodiment. Therefore a duplicate description of the same structure is avoided. Lock pin 15, which is engaged with hooked portion 7a of the internal cover plate, is carried by detent lever 33. This in turn is supported for a given angular rotation on the camera body and forced by spring 34 to engage hooked portion 7a. Spring 34 engages the lever and is held in tension between the lever and a pin. Detection lever 35 is pivotally supported for a given angular rotation on the camera body in the same manner as the above-mentioned detent lever. It is forced by spring 36 to return to the position shown in FIG. 13(A). The tip 35a of the detection lever projects from the rear surface of the camera back cover to engage the latter. On detection lever 37 is rotably mounted a hook lever 37. This is forced by spring 38 to bring the hooked portion formed at the end of lever 37 into engagement with pin 33a carried by detent lever 35.

With the above arrangement, internal cover plate 7 is locked by lock pin 15 at the covering position. It is prevented from opening inadvertently, under the condition where the leader portion of the film is put on the sprocket and internal cover plate 7 has been closed as shown in FIG. 13(A). Then, when camera back cover 8 is closed, detection lever 35 is pushed inwardly by camera cover 8 as shown in FIG. 13(B). Thus hook lever 37 which is pivoted on that detection lever goes over pin 33a on the detent lever and reaches a position to engage that pin. With this condition, internal cover plate 7 is still held by lock pin 15 at the covering position. Therefore, the leader portion of the film is always pressed against the sprocket.

During this operation, first the camera back cover 8 is opened after the completion of exposure of all frames and film rewinding. Then the detection lever 35, being released from pressure by means of camera back cover 8, rotates in the counterclockwise direction by the force of spring 36. This forces the detent lever 33 to turn by means of hook lever 37, which is engaged by pin 33a, against the spring 34. This engages the lever 33. Accordingly, internal cover plate 7 is released from the lock effected by lock pin 15. Forced by spring 10, it automatically moves to the open position in preparation for the next load of film. (See FIG. 3(C))

It is further understood by those skilled in the art that the foregoing description is given of preferred embodiments of the invention and that various changes and modifications may be made in the invention without departing from the spirit and scope thereof.

What is claimed is:

1. A camera for use with a roll film housed in a film cartridge and having sprocket holes in the lengthwise direction, camera comprising:
   a film take-up chamber;
   a film cartiridge chamber capable of receiving the film cartridge;
   an exposure station having an exposure aperture;
   a sprocket having sprocket pawls engageable with sprocket holes of the film withdrawn from the film cartridge past said exposure station for transportation of the film toward said film take-up chamber;
   a spool disposed in said film take-up chamber and having means for enabling the winding of a leader portion of the film around said spool;
   a back cover supported for movement between a covering position where it covers said film take-up chamber, said film cartridge chamber and said exposure station and an uncovering position where it uncovers said film take-up chamber, said film cartridge chamber and said exposure station;
   an internal cover member supported independently of said back cover for movement between a covering position where it covers said film take-up chamber and an uncovering position where it uncovers said film take-up chamber, said internal cover member, in said covering position, being capable of contacting the film for preventing the sprocket hole of the film having engaged one of said sprocket pawls from being disengaged therefrom; and locking means for releasably locking said internal cover member in said covering position, said locking means being interlocked with said back cover to be disabled for releasing said internal cover member in response to the movement of said back cover from said uncovering position to said covering position.

2. A camera as defined in claim 1, further comprising film pressure means provided in said film take-up chamber for resiliently contacting the leader portion of the film to assure engagement of one of the sprocket holes of the leading portion of the film with one of said spool pawls.

3. A camera as defined in claim 1, further comprising means for urging said internal cover member to said uncovering position.

4. A camera as defined in claim 1, wherein said internal cover member includes a recessed portion which, with said internal cover member being in said covering position, receives therein one of said sprocket pawls for avoiding abuttment thereof with said internal cover member.

5. A camera as defined in claim 1, further comprising a film pressure roller which is rotatably supported on said internal cover member at a position where it can enter the space between said sprocket and said spool with said internal cover member being in said covering position for pressure contact with a portion of the film fed from said sprocket to said spool.

6. A camera as defined in claim 1, wherein said internal cover member further includes projection means abuttable with said back cover with said back cover being in said covering position for restricting the position of said internal cover member in said covering position.

7. A camera as defined in claim 1, wherein said internal cover member includes an inner film guide surface which has a curvature causing said film guide surface to extend substantially parallel to the circumference of said spool and to become continuous with the inner wall of said film take-up chamber with said internal cover member being in said covering position.

8. A camera as defined in claim 1, wherein said internal cover member is provided at a portion facing said exposure station with a slant surface which serves to broaden a film inlet into said film take-up chamber from said exposure station.

9. A camera as defined in claim 1, wherein said means for enabling winding includes spool pawls on said spool engageable with the sprocket holes of the film.

10. A camera for use with a roll film housed in a film cartridge and having sprocket holes in the lengthwise direction, said camera comprising:
a film take-up chamber;
a film cartridge chamber capable of receiving the film cartridge;
an exposure station having an exposure aperture;
a sprocket having sprocket pawls engageable with sprocket holes of the film withdrawn from the film cartridge past said exposure station for transportation of the film toward said film take-up chamber;
a spool disposed in said film take-up chamber and having means for enabling the winding of a leader portion of the film around said spool;
a back cover supported for movement between a covering position where it covers said film take-up chamber, said film cartridge chamber and said exposure station and an uncovering position where it uncovers said film take-up chamber, said film cartridge chamber and said exposure station;
an internal cover member supported independently of said back cover for movement between a covering position where it covers said film take-up chamber and an uncovering position where it uncovers said film take-up chamber, said internal cover member, in said covering position, being capable of contacting the film for preventing the sprocket hole of the film having engaged one of said sprocket pawls from being disengaged therefrom; and
locking means for releasably locking said internal cover member in said covering position, wherein said locking means includes a hooked portion on said internal cover member, a detent member supported for movement into and out of engagement with said hooked portion, and a spring for urging said detent member for movement into engagement with said hooked portion, said hooked portion having a slanted surface which abuts said detent member in the course of the movement of said internal cover member from said uncovering position to said covering position for forcing said detent member to move out of engagement with said hooked portion against the influence of said spring and which disengages said detent member when said internal cover member reaches said covering position.

11. A camera as defined in claim 10, further comprising means for urging said internal cover member to said uncovering position.

12. A camera as recited in claim 10, wherein said detent member is adapted to be moved to be out of engagement with said hooked portion in response to the movement of said back cover member to said covering position.

13. A camera for use with a roll film housed in a film cartridge and having sprocket holes in the lengthwise direction, said camera comprising:
a film take-up chamber;
a film cartridge chamber capable of receiving the film cartridge;
an exposure station having an exposure aperture;
a sprocket having sprocket pawls engageable with sprocket holes of the film withdrawn from the film cartridge past said exposure station for transportation of the film toward said film take-up chamber;
a spool disposed in said film take-up chamber and having means for enabling the winding of a leader portion of the film around said spool;
a back cover supported for movement between a covering position where it covers said film take-up chamber, said film cartridge chamber and said exposure station and an uncovering position where it uncovers said film take-up chamber, said film cartridge chamber and said exposure station;
an internal cover member supported independently of said back cover for movement between a covering position where it covers said film take-up chamber and an uncovering position where it uncovers said film take-up chamber, said internal cover member, in said covering position, being capable of contacting the film for preventing the sprocket hole of the film having engaged one of said sprocket pawls from being disengaged therefrom;

locking means for releasably locking said internal cover member in said covering position;

driving means including an electric motor for driving said sprocket and said spool for film transportation and film winding; and a motor driving circuit for controlling electric power supply to said electric motor, said circuit including a first switch closed for supplying electric power to said electric motor when said internal cover member is in said covering position.

14. A camera as defined in claim 13, wherein said circuit further includes a control circuit for interrupting the electric power supply to said electric motor after a given period of time from the closure of said first switch.

15. A camera as defined in claim 14, wherein said motor driving circuit further includes a second switch opened for interrupting the electric power supply to said electric motor when an initial frame of the film is transported to said exposure station so as to be in alignment with said exposure aperture.

16. A camera as defined in claim 14, further comprising a film counter which is interlocked with said second switch.

17. A camera for use with a roll film housed in a film cartridge and having sprocket holes in the lengthwise direction, said camera comprising:
 a film take-up chamber;
 a film cartridge chamber capable of receiving the film cartridge;
 an exposure station having an exposure aperture;
 a sprocket having sprocket pawls engageable with sprocket holes of the film withdrawn from the film cartridge past said exposure station for transportation of the film toward said film take-up chamber;
 spool disposed in said film take-up chamber and having means for enabling the winding of a leader portion of the film around said spool;
 a back cover supported for movement between a covering position where it covers said film take-up chamber, said film cartridge chamber and said exposure station and an uncovering position where it uncovers said film take-up chamber, said film cartridge chamber and said exposure station;
 an internal cover member supported independently of said back cover for movement between a covering position where it covers said film take-up chamber and an uncovering position where it uncovers said film take-up chamber, said internal cover member, in said covering position, being capable of contacting the film for preventing the sprocket hole of the film having engaged one of said sprocket pawls from being disengaged therefrom;
 locking means for releasably locking said internal cover member in said covering position independently of said back cover, and
 releasably means coupled with said locking means when said back cover is moved to said covering position and disabling said locking means through the coupling in response to the movement of said back cover from said covering position to said uncovering position.

18. A camera as defined in claim 17, further comprising means for urging said internal cover member to said uncovering position.

19. A camera as defined in claim 17, wherein said releasing means includes:
 a lever urged to a projecting position to be pushed back by said back cover when said back cover is moved to said covering position; and
 a coupling member mounted on said lever to engage said locking means with said lever pushed back by said back cover,
 wherein said lever is moved to said projecting position under its urge in response to the movement of said back cover from said covering position to said uncovering position, causing said coupling member to disable said locking means.

* * * * *